United States Patent
Mo et al.

(10) Patent No.: US 8,744,279 B2
(45) Date of Patent: Jun. 3, 2014

(54) ADAPTIVE PMD EQUALIZER AND IMPLEMENTATION

(75) Inventors: Fan Mo, Hinckley, OH (US); Sameep Dave, Hinckley, OH (US); Lawrence W. Esker, Concord, OH (US)

(73) Assignee: ViaSat, Inc., Carlsbad, CA (US)

( * ) Notice: Subject to any disclaimer, the term of this patent is extended or adjusted under 35 U.S.C. 154(b) by 410 days.

(21) Appl. No.: 13/205,437

(22) Filed: Aug. 8, 2011

(65) Prior Publication Data

US 2012/0189319 A1 Jul. 26, 2012

Related U.S. Application Data

(60) Provisional application No. 61/435,278, filed on Jan. 22, 2011.

(51) Int. Cl.
*H04B 10/06* (2006.01)

(52) U.S. Cl.
USPC ........... 398/208; 398/202; 398/209; 398/147; 398/158; 398/159; 398/152; 398/136; 398/205; 398/206

(58) Field of Classification Search
CPC ............... H04B 10/60; H04B 10/6161; H04B 10/6162; H04B 10/6166; H04B 10/6971; H04B 10/2569
USPC ........... 398/206, 208, 209, 152, 65, 205, 214, 398/158, 159, 161, 33, 147, 202, 203, 204, 398/210, 135, 136, 25, 26, 27, 29, 183, 188
See application file for complete search history.

(56) References Cited

U.S. PATENT DOCUMENTS

| | | | |
|---|---|---|---|
| 7,251,256 B1 | 7/2007 | Barry et al. | |
| 7,266,310 B1 | 9/2007 | Savory et al. | |
| 7,522,841 B2 | 4/2009 | Bontu et al. | |
| 8,095,019 B2 * | 1/2012 | Kaneda et al. | 398/208 |
| 8,478,135 B2 * | 7/2013 | Xie | 398/208 |
| 8,571,423 B2 * | 10/2013 | Winzer | 398/208 |

(Continued)

FOREIGN PATENT DOCUMENTS

EP          2352239 A1      8/2011

OTHER PUBLICATIONS

International Search Report and Written Opinion dated Aug. 30, 2012, PCT/US2012/022231 to ViaSat, Inc. et al., 8 pgs.

(Continued)

*Primary Examiner* — Hanh Phan
(74) *Attorney, Agent, or Firm* — Holland & Hart LLP

(57) ABSTRACT

Polarization mode dispersion (PMD) in a dual-pole optical communications network is compensated for using an adaptive PMD equalizer. The PMD equalizer may include a number of substantially identical filter modules that provide partial outputs which may be combined to form a PMD compensated output. A constant modulus algorithm (CMA)-based equalizer may track PMD across both poles and generates an error signal. The CMA-based equalizer includes a filter bank, and uses an update algorithm and tap/output adjustments based on a difference between combined tap energies and an index, and feedback from a forward error correction code frame synchronizer.

25 Claims, 12 Drawing Sheets

(56) References Cited

U.S. PATENT DOCUMENTS

| | | |
|---|---|---|
| 2004/0184487 A1 | 9/2004 | Kim |
| 2004/0223767 A1 | 11/2004 | Pappalardo et al. |
| 2006/0013590 A1 | 1/2006 | Hueda et al. |
| 2007/0065078 A1 | 3/2007 | Jiang |
| 2007/0217792 A1 | 9/2007 | Nonaka et al. |
| 2008/0152361 A1* | 6/2008 | Chen et al. ................ 398/205 |
| 2010/0209121 A1 | 8/2010 | Tanimura |
| 2010/0232809 A1 | 9/2010 | Cai et al. |
| 2010/0239264 A1 | 9/2010 | Yang et al. |
| 2010/0329677 A1 | 12/2010 | Kaneda et al. |
| 2011/0064421 A1 | 3/2011 | Zhang et al. |
| 2012/0033965 A1 | 2/2012 | Zhang et al. |
| 2013/0136450 A1 | 5/2013 | Roberts et al. |

OTHER PUBLICATIONS

International Search Report and Written Opinion dated Aug. 30, 2012, PCT/US2012/022234 to ViaSat, Inc. et al., 10 pgs.

International Preliminary Report on Patentability dated Aug. 1, 2013, Int'l App. No. PCT/US2012/022231 to ViaSat, Inc. et al., 5 pgs.

Non-final Office Action dated Jul. 29, 2013, U.S. Appl. No. 13/205,431 to Mo et al., 12 pgs.

Non-final Office Action dated Dec. 28, 2012, U.S. Appl. No. 13/205,431 to Mo et al., 12 pgs.

Non-final Office Action dated Aug. 30, 2013, U.S. Appl. No. 13/356,192 to Mo et al., 19 pgs.

* cited by examiner

ADAPTIVE PMD EQUALIZER AND IMPLEMENTATION

CROSS REFERENCES

The present application claims the benefit of U.S. Provisional Patent Application No. 61/435,278, filed on Jan. 22, 2011, entitled "HIGH RATE OPTICAL COMMUNICATION," which is incorporated herein by reference in its entirety.

BACKGROUND

The present disclosure relates to systems and methods cross-polarization interference compensation in dual polarization fiber optic communications systems in general and, in particular, to an adaptive polarization mode dispersion (PMD) equalizer that compensates for PMD that may be present on in-phase and quadrature signals in a dual-polarity optical communications network.

Fiber optic channels in network communications systems are well known and are considered effective for data transmission, allowing relatively high bandwidth data communication. Optical fiber used in such channels is flexible and can be bundled as cables, and is generally considered to be advantageous for long-distance communications, because light propagates through the fiber with little attenuation compared to electrical cables. Typical present day commercial optical fiber systems transmit data at 10 or 40 Gbit per second. Each fiber can carry multiple independent channels, each using a different wavelength of light in a technique known as wavelength-division multiplexing (WDM), thereby enhancing the net data rate of an optical fiber.

As more capacity is continually desired for networks, increased data transmission rates would be desirable. However, in fiber optic systems, as data rates increase various optical phenomena begin to manifest and act to limit data transmission rates. For example, optical effects from chromatic dispersion (CD), polarization mode dispersion (PMD), and polarization dependent loss (PDL), to name a few examples, begin to have a significant impact on the data transmission rate.

SUMMARY

Methods, systems, and devices are described for adaptive equalization of polarization mode dispersion (PMD) in an optical signal. An example of a method of PMD compensation includes receiving a digitized version of an optical signal, and utilizing a constant modulus algorithm in an adaptive equalizer to compensate for the effects of PMD. The adaptive equalizer may include a number of finite impulse response (FIR) filters, with the common modulus algorithm utilized to compute filter coefficients for the FIR filters.

An example of an apparatus for adaptive equalization of PMD in an optical signal includes an input that receives digitized versions of in-phase and quadrature channels of horizontal and vertical polarity optical signals, a number of substantially identical FIR filter modules, and an error calculation and output generation module that outputs a PMD compensated version of each channel of the digitized optical signal. The FIR filter modules may receive the input channels and output one or more partially filtered input channels to the error calculation and output generation module. The FIR filter modules receive filter tap error updates from the error calculation and output generation module, adjust FIR filter tap values based on the received tap error updates, and partially filter one or more of the input channels based on the adjusted FIR filter tap values. The error calculation and output generation module receives the partially filtered input channels from the FIR filter modules, combines the partially filtered input channels into the output, and calculates filter tap error updates. The FIR filter modules may collectively form a number of FIR filters, each FIR filter having a number of taps that are spread across different FIR filter modules. The FIR filter modules may be configured such that each module is substantially identical and may be combined to form a scalable number of FIR filters. Tap error updates provided to the FIR filter modules may be calculated according to a constant modulus algorithm to compensate for the effects of PMD. Tap error updates may be calculated using a positive or negative sign and/or a computed magnitude of calculated error. The FIR filter modules may comprise real-valued, or complex-valued FIR filters.

An apparatus for adaptive equalization of polarization mode dispersion in an optical signal may include an input configured to receive multiple input channels corresponding to digitized versions of in-phase and quadrature channels of horizontal and vertical polarity optical signals; a plurality of substantially identical finite impulse response (FIR) filter modules, configured to receive the input channels, receive filter tap error updates, adjust FIR filter tap values based on the received tap error updates, partially filter one or more of the input channels based on the adjusted FIR filter tap values, and output one or more partially filtered input channels; and an error calculation and output generation module configured to receive the partially filtered input channels from the FIR filter modules, combine the partially filtered input channels, output a polarization mode dispersion compensated version of each channel of the digitized optical signal, calculate filter tap error updates, and provide the tap error updates to the plurality of FIR filter modules.

A method for adaptive equalization of polarization mode dispersion in an optical signal may include receiving multiple input channels corresponding to digitized versions of in-phase and quadrature channels of horizontal and vertical polarity optical signals; partially filtering one or more of the input channels at a plurality of substantially identical FIR filter modules, each of the plurality of FIR filter modules including a portion of the filter taps for one or more FIR filters; receiving partially filtered input channels at an error calculation and output generation module; calculating, at the error calculation and output generation module, tap error updates for each of the FIR filter modules; outputting, from the error calculation and output generation module, the tap error updates to the plurality of FIR filter modules; and outputting, from the error calculation and output generation module, a polarization mode dispersion compensated version of each channel of the digitized optical signal.

A method of polarization mode dispersion compensation may include receiving a digitized version of an optical signal, and utilizing a constant modulus algorithm in an adaptive equalizer to compensate for the effects of polarization mode dispersion.

BRIEF DESCRIPTION OF THE DRAWINGS

A further understanding of the nature and advantages of embodiments of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides examples, and is not intended to limit the scope, applicability or configuration of embodiments of the present invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
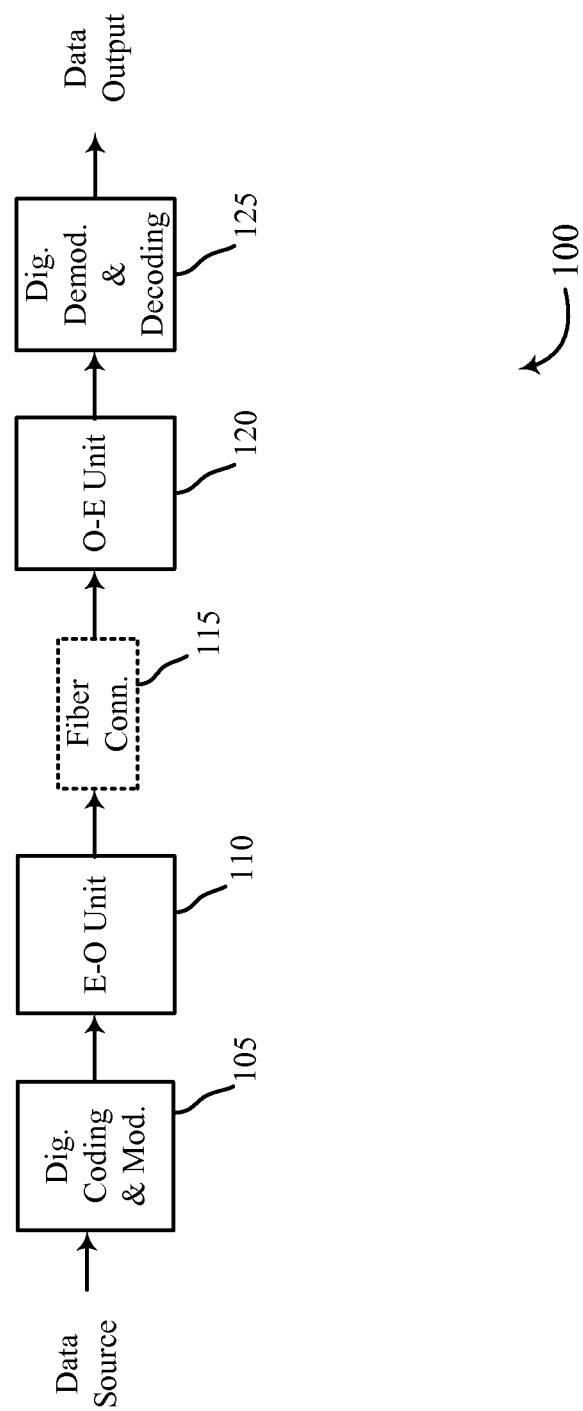
FIG. 1 is a block diagram of an optical communication system including components configured according to various embodiments of the invention.

Systems, devices, methods, and software are described for an optical communication system that utilizes fiber optic optical cables as a data transmission medium. An example of an optical data transport system 100 is illustrated in FIG. 1. In this embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. The digital coding and modulation unit 105 receives this data, and performs framing, forward error correction coding, and modulation functions on the data. The electrical-to-optical (E-O) unit 110 transforms the data into optical signals, and transmits optical signals containing the data via a fiber connection 115. The fiber connection 115 may include well known components of such connections, including a fiber optic cable. An optical-to-electrical (O-E) unit 120 receives the optical signal from the fiber connection 115, and transforms the data into the electrical domain. The digital demodulation and decoding unit 125 receives the digitized version of the optical signal and performs demodulation, forward error correction decoding, and de-framing functions on the data from the optical signal. The digital demodulation and decoding unit 125 may then output the data (e.g., to a user telecommunications device, a cable operator head-end unit, a telecommunications provider central office, a computer server, or a network attached storage system).

Figure 2:
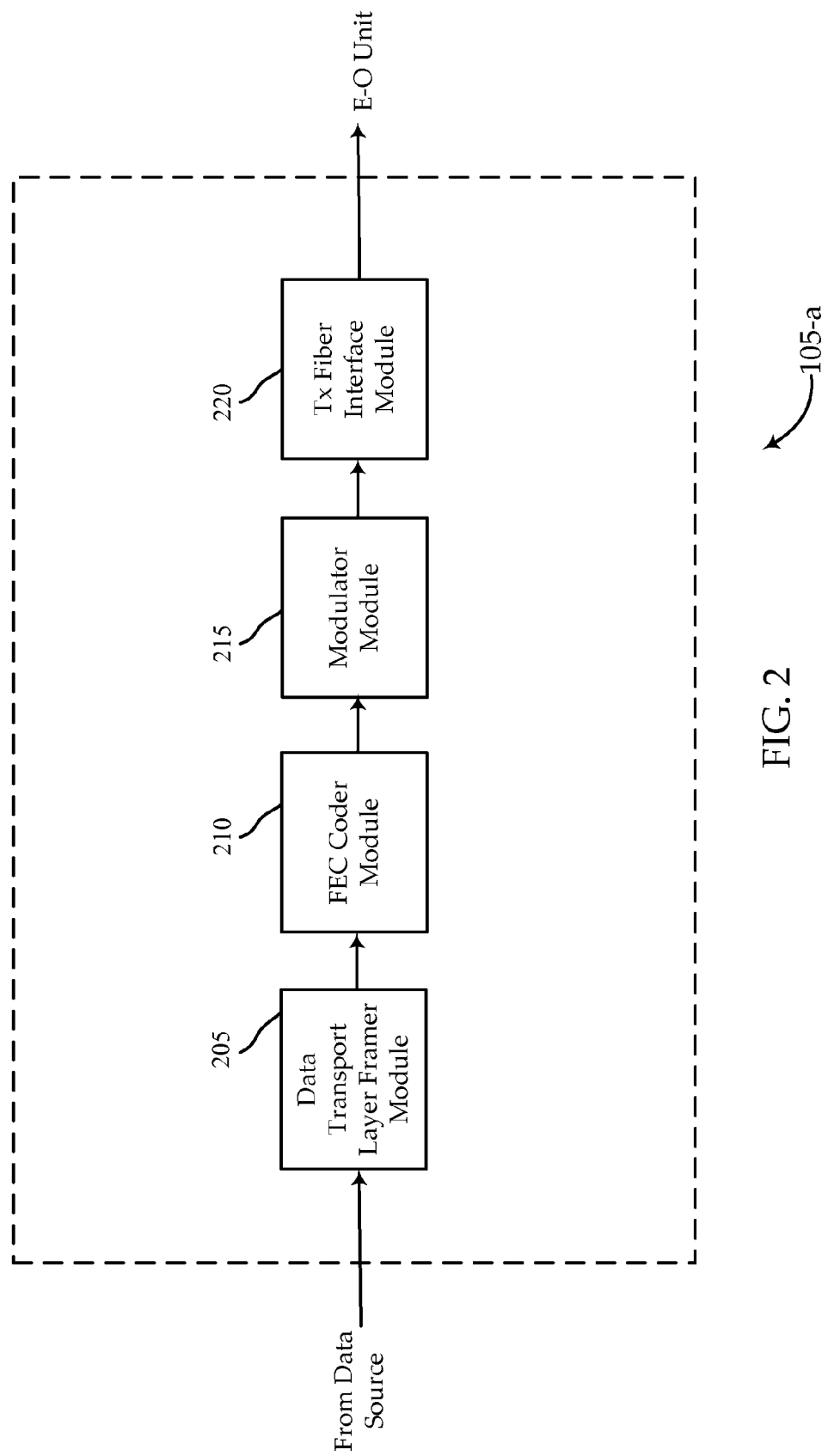
FIG. 2 is a block diagram of an electrical-to-optical unit according to various embodiments of the invention.

FIG. 2 illustrates a digital coding and modulation unit 105-$a$. In the illustrated embodiment, the digital coding and modulation unit 105-$a$ includes a data transport layer framer module 205, an FEC coder module 210, a modulator module 215, and a transmitter fiber interface module 220. The data transport layer framer module 205 may place the data received from the data source into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission. The FEC coder module 210 calculates and adds forward error correction (FEC) information to the frames of data received from the data transport layer framer module 205. The particular type of FEC information of various embodiments generally includes systematically generated redundant error-correcting code (ECC) data that is transmitted along with the frames. The modulator module 215 modulates the frames and FEC information, forwarding the data to a transmitter fiber interface module 220. The transmitter fiber interface module 220 may forward the modulated data to the E-O module where it may be transmitted in the optical domain via a dual-polarity (dual-pole) quadrature phase-shift-keying (QPSK) modulation, resulting in four parallel optical streams. Other modulation schemes may be used in other examples, as well.

Figure 3:
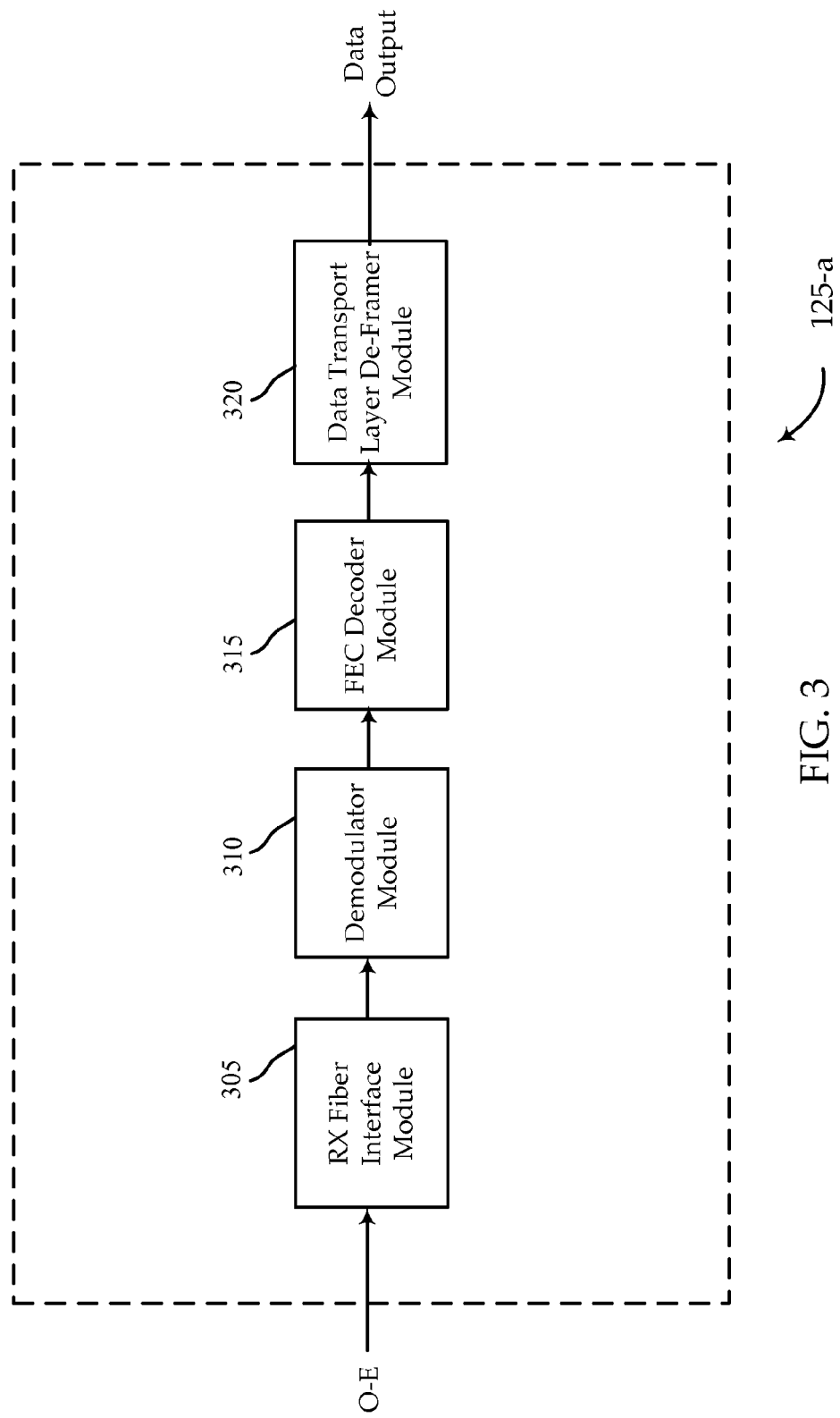
FIG. 3 is a block diagram of an optical-to-electrical unit according to various embodiments of the invention.

As illustrated in FIG. 3, a digital demodulation and decoding unit 125-$a$ may include a number of modules, as well. In this embodiment the digital demodulation and decoding unit 125-$a$ includes a receiver fiber interface module 305, a demodulator module 310, an FEC decoder module 315, and a data transport layer de-framer module 320. The receiver fiber interface 305 is the interface from the O-E unit 120. The receiver fiber interface module 305 provides electrical signals to a demodulator module 310. Various embodiments of the demodulator module 310 will be discussed in further detail below. The information from the demodulator module 310 is provided to the FEC decoder module 315 which decodes and may correct transmission errors identified from error-correcting code. The FEC decoder module 315 provides decoded data to the data transport layer de-framer module 320, which de-frames the data from the signal according to the particular protocol used in the optical transmission, and provides output data. The data output may be, for example, a user or any receiving system.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 4:
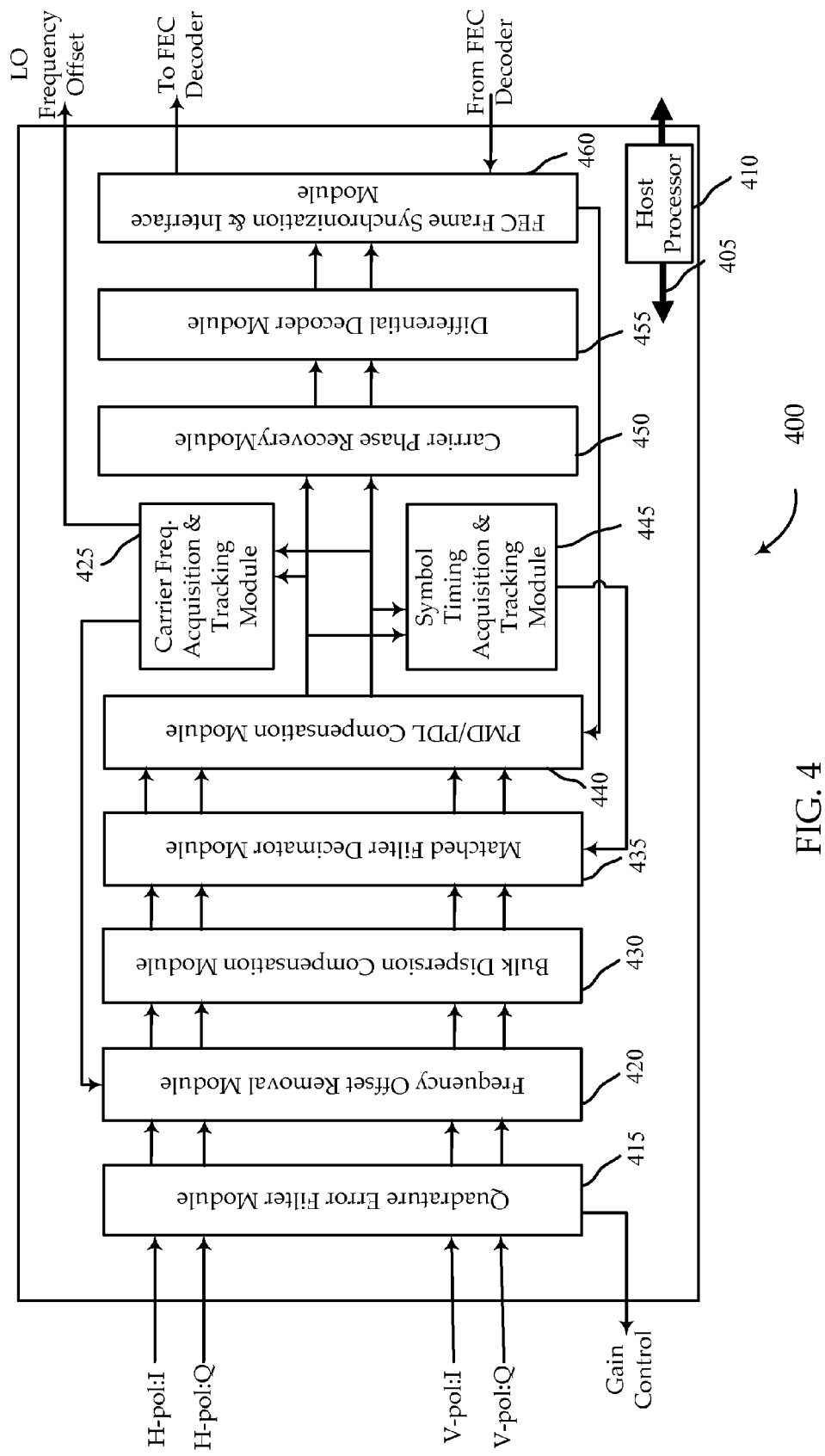
FIG. 4 is a block diagram of a demodulator unit according to various embodiments of the invention.

Referring now to FIG. 4, a demodulator unit 400 is described. This may be the demodulator unit 310 of FIG. 3. In this example, two polarization components are received, one horizontal component (H) and one vertical component (V). Each of the H and V components includes both an in-phase (I) component and a quadrature (Q) component. For reference, the two components in the horizontal polarization are referred to as HI (horizontal in-phase component) and HQ (horizontal quadrature component). Similarly, the two components in the vertical polarization are referred to as VI (vertical in-phase component) and VQ (vertical quadrature component). The demodulator unit 400 processes the digitized samples of the I and Q components of the two polarization components to recover the transmitted data. At the input, the demodulator unit 400 accepts the four parallel streams carrying HI, HQ, VI and VQ samples. In one embodiment, each stream contains multiple samples per clock. At its output the demodulator may provide demodulated hard-decision data (although in other examples, soft-decision data may be provided) to the FEC decoder module (e.g., FEC decoder module 315 of FIG. 3). The demodulator unit 400 may identify the beginning of an FEC frame. Additionally, in some embodiments the demodulator unit 400 receives feedback signals from the FEC decoder module 315 regarding the convergence status for error correction.

In some embodiments, the demodulator unit 400 is implemented as an application specific integrated circuit (ASIC) that includes a number of functional modules. In such embodiments, the demodulator unit 400 may have a control and monitor interface bus 405 connected to a host processor 410 allowing for configuration of demodulator parameters (filter coefficients, loop gains, etc.) and extraction of demodulator status. With continuing reference to FIG. 4, several of the sub-modules within the demodulator unit 400 of various embodiments are described. In this embodiment, a quadrature error filter (QEF) module 415 provides a collection of data formatting, error detection and correction functions. In one embodiment, input data samples are expected to be in binary-offset/offset-binary format and are converted to a two's complement (2C) format for processing within a digital signal processor. The incoming HI, HQ, VI and VQ streams, in some embodiments, also can be independently swapped and inverted if needed, allowing for any design issues that might translate into an accidental inversion or IQ swap. Each data stream of these various embodiments may be processed to remove polarization skew (between H and V poles) as well as I-Q skew within a pole. The QEF module 415 may provide for detection and removal of four types of quadrature signal errors: I/Q Skew, DC bias, I/Q amplitude imbalance, and I/Q phase imbalance. All four error detectors may be independently enabled or disabled, in some embodiments, via the processor interface, and the detected error values are output as status values via this same interface. The QEF module 415 may also output a gain control signal that may be used by other components of the system.

The QEF module 415 is connected to a frequency offset removal module 420. The frequency offset removal module 420 in one example performs a frequency rotation on the data samples coming out of the QEF module 415. The amount of frequency rotation is controlled by a frequency error input that is sourced by a carrier frequency acquisition and tracking (CFAT) module 425. Such frequency offset removal function may remove residual frequency left from the LO laser tuning in the optical domain. A bulk dispersion compensation module 430 removes bulk chromatic dispersion from the horizontal and vertical polarization channels. The compensation may be applied via a filter in the frequency domain. The amount of correction may be controlled by the chromatic dispersion filter inputs that are derived outside of the demodulator module 400 and provided via the host processor 410 and control and monitor interface bus 405, in this embodiment.

A matched filter decimator (MFD) module 435 may implement an interpolation function that provides decimation on samples taken at two+ϵ times the symbol rate. In one embodiment, each of the four data streams has an independent bank of FIR filters with selected coefficients. The incoming data is processed through the filter banks to produce two samples per symbol out for each data stream. Data samples are gathered and assembled into blocks of fixed number of samples per stream per clock by a sample block assembler. The assembly function may be identical for the I and Q streams in each polarization so one assembly block may service two streams. A PMD/PDL compensation module 440 may utilize adaptive equalization to compensate for cross-polarization interference, IQ channel interference, adjacent symbol interference introduced by PMD and PDL in optical channel and other residual impairments, such as residual chromatic as mentioned above. On one embodiment, an adaptive equalizer takes in data at one or two samples/symbol from the MFD and processes the data through a bank of FIR filters with adaptive filter tap coefficients.

In some embodiments, a symbol timing acquisition and tracking (STAT) module 445 may estimate symbol timing using an early/late symbol radius matching scheme and PI controller, and generate an error signal to correct symbol timing. This STAT module 445, in an embodiment, also has a symbol timing lock detection mechanism that outputs a symbol lock indicator. In various embodiments, there are two sets of gains for the PI controller (wide band for acquisition and narrow band for tracking). When not in timing lock, the wideband gains may be used, otherwise, the narrowband gains may be used. The STAT module 445 may perform symbol timing acquisition and tracking a portion of the optical signal after the PMD/PDL compensation module 440 compensates for interference caused by PMD and PDL and before carrier phase recovery on the portion of the optical signal.

The CFAT module 425 may be responsible for acquiring, as well as tracking, carrier frequency. Carrier frequency acquisition is achieved using one of a number of techniques, such as through fast Fourier transform (FFT) with appropriate averaging and peak frequency component detection. The CFAT module 425 may provide a frequency error input to the frequency offset removal module 420. The CFAT module 425, in some embodiments, also provides local oscillator (LO) frequency offset output that may be used with data from the FEC frame synchronization and interface module 460. A carrier phase recovery (CPR) module 450 may use a feedforward algorithm with a block phase estimator and a phase rotation function to remove residual frequency and phase errors. The CPR module 450 may operate on the on-time data samples produced by the PMD compensation module. A differential decoder module 455 may be responsible, in various embodiments, for accepting symbol streams from the CPR module 450 (e.g., at 1 sample per symbol). The differential decoder module 455 may be configured to differentially decode the signal and provide the decoded output (e.g., a hard-decision output data stream) to the FEC frame synchronization and interface module 460. The FEC frame synchronization and interface module 460 processes data to achieve frame synchronization, and may include three functional blocks for data alignment, frame sync detection, and clock transfer. The FEC frame synchronization and interface module 460 may be configured to skew, swap, and rotate received channels with respect to each other.

Figure 5:
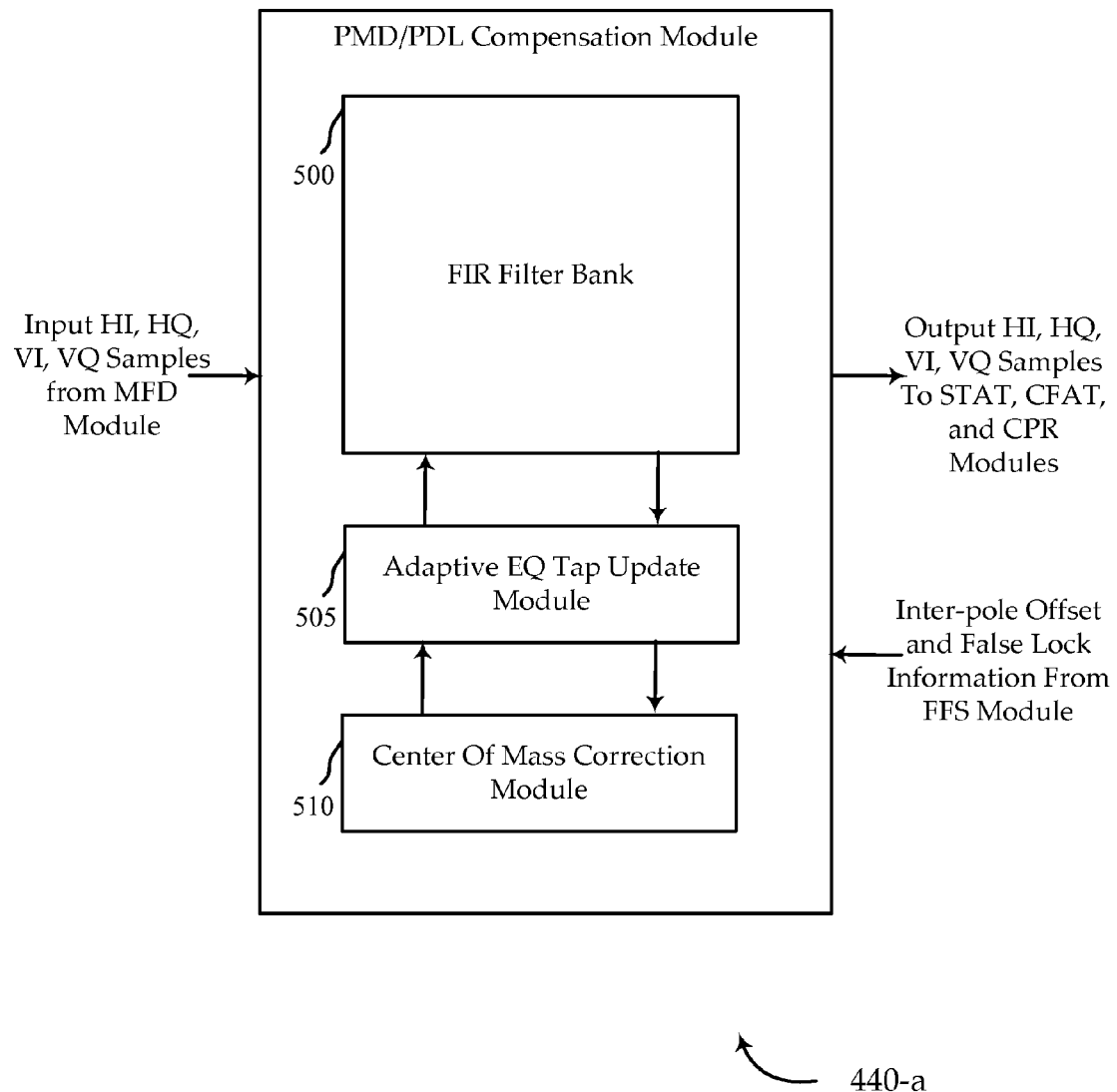
FIG. 5 is a block diagram of a polarization mode dispersion and polarization dependent loss compensation module according to various embodiments of the invention.

With reference now to FIG. 5, a block diagram of a PMD/PDL compensation module 440-$a$ according to various embodiments is described. The PMD/PDL compensation module 440-$a$ of FIG. 5 utilizes adaptive equalization to compensate for PMD, PDL, and miscellaneous residual impairments that translate into interference and/or undesired interaction between samples of the same channel/stream/tributary, samples of another channel in the same pole, or samples of other channels across both poles. In one embodiment, the PMD/PDL compensation module 440-$a$ takes in data at two samples/symbol from the matched filter decimator (MFD) module 435 of FIG. 4, and processes the data through a bank of FIR filters 500 with adaptive filter taps/coefficients. The filter taps for the FIR filters 500 are set, in an embodiment, according to the output of adaptive EQ tap update module 505. Adaptive equalization may be accomplished, according to various embodiments, using a constant modulus algorithm (CMA) to generate updated filter taps for the FIR filters 500. In some embodiments, as will be described in more detail below, the bank of FIR filters 500 is implemented using a number of FIR filter modules that each contain a portion of one or more FIR filters and provide a partial output, with the EQ tap update module 505 receiving the partial outputs, providing further compensation as needed, and outputting the final PMD/PDL compensated output. The PMD/PDL compensation module 440-$a$ of FIG. 5 also includes a center of mass correction module 510, that is configured to add or remove symbols to/from the output to compensate, as needed, for corresponding shifts in the filter taps. The filtered output is sent from the PMD/PDL compensation module to the Symbol Timing Acquisition and Tracking (STAT) module 445, Carrier Frequency Acquisition and Tracking (CFAT) module 425, and Carrier Phase Recovery (CPR) module 450 of FIG. 4. The STAT module 445, in an embodiment, gets two samples (on-time and off-time) per symbol for half of the symbols, while the CFAT module 425 and CPR module 450 get 1 sample (on-time) per symbol for all the symbols.

Figure 6:
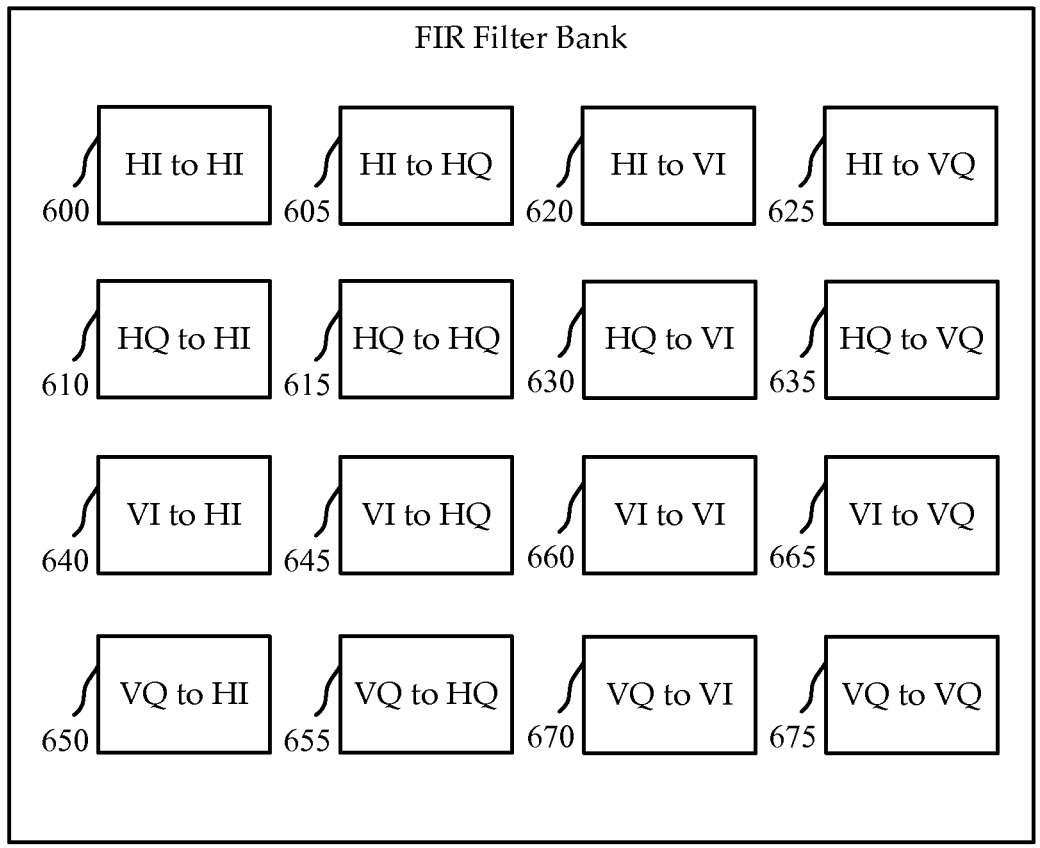
FIG. 6 is a block diagram of a finite impulse response filter bank according to various embodiments of the invention.

FIG. 6 is a block diagram illustration of a FIR filter bank 500-$a$ according to various embodiments. The FIR filter bank of FIG. 6 includes sixteen 16-tap real FIR filters 600-675 operating at two taps per symbol. Each filter 600-675 is marked to indicate that the particular filter is configured to filter the impact of a particular input channel to a particular output channel. For example the HI-to-VQ filter 625 calculates the impact of HI (Horizontal-pole In-phase) signal on the VQ (Vertical-pole Quadrature-phase) signal. Accordingly, each row in the FIR filter bank 500-$a$ represents the impact of a certain input channel on every output channel. Similarly, each column in the FIR filter bank 500-$a$ represents the impact of all input channels onto a particular output channel. The output of a particular channel, for example, the HI channel which comprises outputs of FIR filters 600 (HI-to-HI), 610 (HQ-to-HI), 640 (VI-to-HI), and 650 (VQ-to-HI), in an exemplary embodiment, is generated according to the following equation:

$$Out_{HI,n} = \sum_{i=-7}^{8} (In_{HI,n+i} \times T_{HI\text{-}to\text{-}HI,i} + In_{HQ,n+i} \times T_{HQ\text{-}to\text{-}HI,i} + In_{VI,n+i} \times T_{VI\text{-}to\text{-}HI,i} + In_{VQ,n+i} \times T_{VQ\text{-}to\text{-}HI,i})$$

Where:
n is the sample index (lower number is earlier in time),
i is index variable,
Out is the output sample where the first subscript shows the output channel and second subscript is the sample index,
In is the input sample where the first subscript shows the input channel and second subscript is the sample index,
and T is the set of filter taps where the first subscript shows which of the 16 filters and the second subscript is the tap index assuming a 16-tap filter where index 0 is the center tap. Of course, as will be readily recognized by one skilled in the art, C or RTL indexing of the taps may be used, in which case the taps would be numbered from 0 to 15 with 7 being the center tap. The example of FIG. 6 utilizes real filters, as opposed to complex filters.

Figure 7:
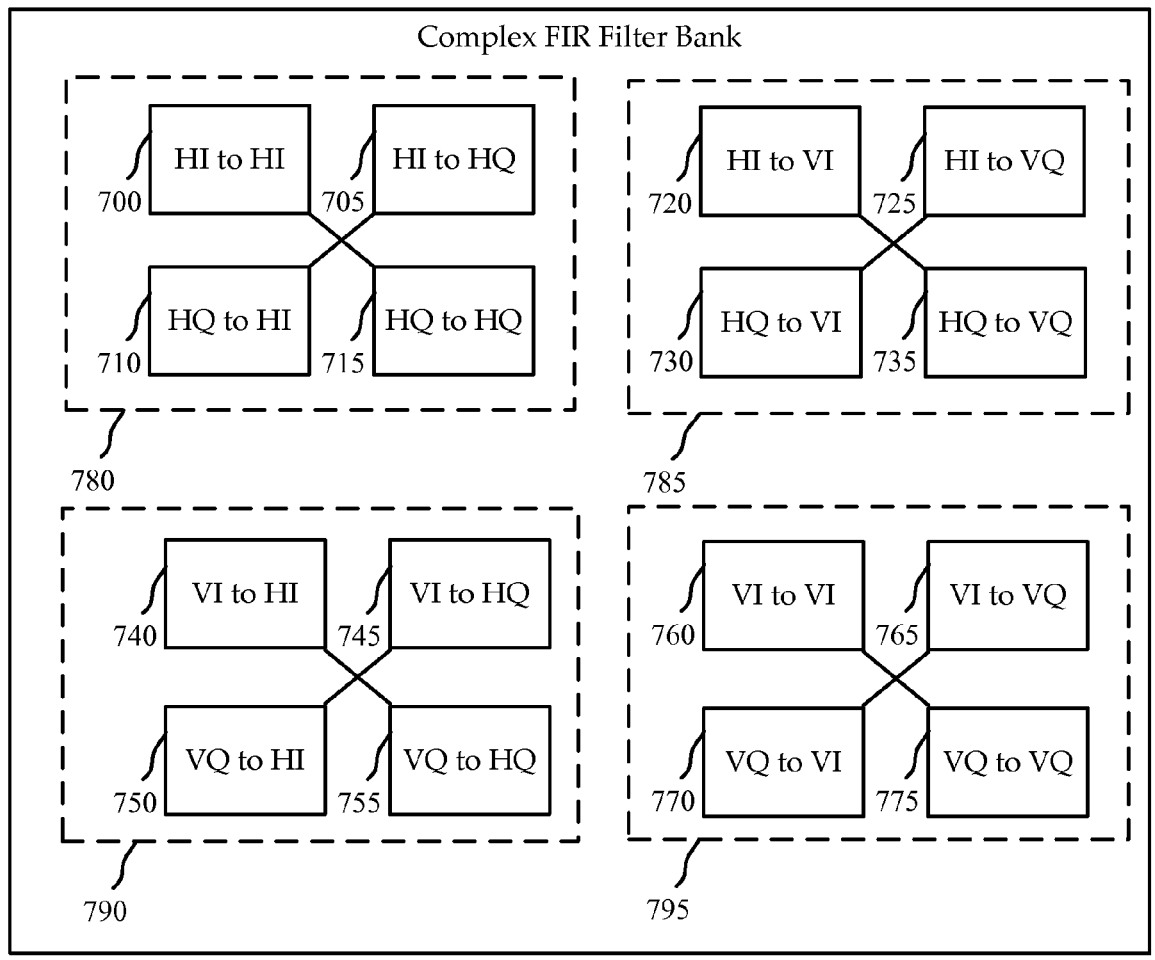
FIG. 7 is a block diagram of a complex finite impulse response filter bank according to various embodiments of the invention.

In other embodiments, the PMD/PDL compensation module 440-$a$ of FIG. 5 may use complex FIR filters. FIG. 7 is a block diagram illustration of a complex FIR filter bank 500-$b$ according to an embodiment. The FIR filter bank 500-$b$ of FIG. 7 includes four complex FIR filters 480-495, that include filter elements 700-775 operating at two taps per symbol. Each filter element 700-775 is marked to indicate that the particular filter is configured to filter the impact of a particular input channel to a particular output channel. The filter elements are arranged in four quadrants to form the four complex FIR filters 780-795, with horizontal-to-horizontal filter elements 700-715 arranged in quadrant 780, horizontal-to-vertical filter elements 720-735 arranged in quadrant 785, vertical-to-horizontal filter elements 740-755 arranged in quadrant 790, and vertical-to-vertical filter elements 760-775 arranged in quadrant 795. Within a quadrant filter elements that are diagonally across to each other have the same taps, or taps that are opposite in sign. This interdependence of the taps is illustrated in FIG. 7 where filter elements connected by a negative slope diagonal line have the same taps, while filter elements connected by a positive slope diagonal line have taps that are opposite in sign.

Filter tap updates may be computed according to a CMA that drives the on-time (at optimal symbol timing) constellation points on each polarization to a circle with a desired radius with minimum radius variation. The filter taps are initialized, according to various embodiment, as an all-pass filter with the center taps 700 ($T_{HI\text{-}to\text{-}HI,0}$), 715 ($T_{HQ\text{-}to\text{-}HQ,0}$), 760 ($T_{VI\text{-}to\text{-}VI,0}$) and 775 ($T_{VQ\text{-}to\text{-}VQ,0}$) initialized to unity and the remaining taps initialized to zeroes. In these embodiments, filter taps are updated using on-time output samples according to an error signal calculated according one of the below equations, each given for exemplary filter element 700 (HI-to-HI). The first equation provides an error signal based on a magnitude of the difference between a desired threshold and squared on-time output samples, and the second equation provides an error signal based on a sign of the difference between a desired threshold and squared on-time output samples.

$$T_{HI\text{-}to\text{-}HI,i,n} = T_{HI\text{-}to\text{-}HI,i,n-1} + (\beta - (\text{Out}_{HI,n}^2 + \text{Out}_{HQ,n}^2)) \times \text{Out}_{Hi,n} + \text{In}_{HI,n+i} \times \mu)$$

$$T_{HI2HI,i,n} = T_{HI2HI,i,n-1} + \text{sign}(\beta - (\text{Out}_{HI,n}^2 + \text{Out}_{HQ,n}^2)) \times \text{Out}_{Hi,n} + \text{In}_{HI,n+i} \times \mu)$$

Where

Out$^2$ is the squared on-time output sample where the first subscript shows the output channel and second subscript is the sample index, β is desired threshold (squared radius) which CMA is driving towards, μ is a gain factor that affects the speed and stability of CMA's convergence, sign(.) calculates the sign of the operand, and rest of the variables have the same meaning as described with respect to the real FIR filters 600-675 of FIG. 6.

With reference again to FIG. 5, the PMD/PDL compensation module 440-a receives several feedback signals from the FEC Frame Synchronizer (FFS) module 460 of FIG. 4. In certain fiber channel conditions the filter taps can converge such that the outputs on both poles are the same, namely both are locked to H or both are locked to V. In such cases the FFS module 460 indicates that the polarization lock is invalid and the PMD/PDL compensation module 440-a will reinitialize the taps to their default value. In some embodiments, the FIR filters that generate the vertical polarity outputs, or alternatively the horizontal polarity outputs, are reinitialized, with the remaining filters keeping their existing tap values. This re-initialization generally results in the filter outputs converging on different poles, and this process can be performed recursively until the desired convergence is achieved.

Also, at the initial acquisition stage, if the FFS module 460 detects a timing offset between the two poles, this offset value is conveyed to the PMD/PDL compensation module 440-a, and the filter taps can be re-initialized or shifted to compensate for the offset. This offset is performed, in an exemplary embodiment, in a balanced fashion between the filter taps generating the outputs for the two poles to ensure sufficient taps are available towards the edge of the filter. If such compensation is not performed the outputs of the FIR filter bank 500 may converge such that during normal operation the higher weight taps on one of the poles get skewed towards the edge of the filter, thereby reducing the number of useful taps.

The PMD/PDL compensation module 440-a of FIG. 5 is also a part of the symbol timing loop along with the STAT module 445 of FIG. 4. The PMD/PDL compensation module 440-a can interact with the symbol timing loop in such a fashion that at times the filter taps on both poles can start drifting towards the edge of the filter, again reducing the number of useful taps. In various embodiments, the center of mass correction module 510 performs an evaluation and correction to make sure that if the useful taps have shifted by a symbol they are moved back towards the center of the filter. To determine if the taps have moved, the difference is calculated between the combined tap energies of the filter taps index −7 to −1 and filter taps index 1 to 7. If the magnitude of this difference is greater than a programmable threshold, the taps are adjusted towards the center. Adjustment of taps will result in addition or deletion of a symbol and is accompanied by the deletion or addition, respectively, of a symbol in the final output channels.

In one embodiment, the PMD/PDL compensation module 440-a of FIG. 5 receives 128 8-bit samples per clock cycle for each of the channels (HI, HQ, VI, and VQ) over one or more data busses from the MFD module 435 of FIG. 4. This results in a total of 512 input samples per clock, at 2 samples/symbol.

At its output the PMD/PDL compensation module 440-a of this embodiment generates 64 8-bit on-time outputs per clock cycle for each of the channels (HI, HQ, VI, and VQ) over one or more data busses, for a total of 256 on-time output samples per clock going to the CFAT module 425 and CPR module 450 of FIG. 4. The PMD/PDL compensation module 440-a of this embodiment also generates 32 8-bit on-time outputs per clock cycle for each of the channels (HI, HQ, VI, and VQ) over one or more data busses, for a total of 128 on-time output samples per clock, going to the STAT module 445. Further, in this embodiment, The PMD/PDL compensation module 440-a generates 32 8-bit off-time outputs per clock cycle for each of the channels (HI, HQ, VI, and VQ) over one or more data busses, for a total of 128 off-time output samples per clock, going to the STAT module 445.

Figure 8:
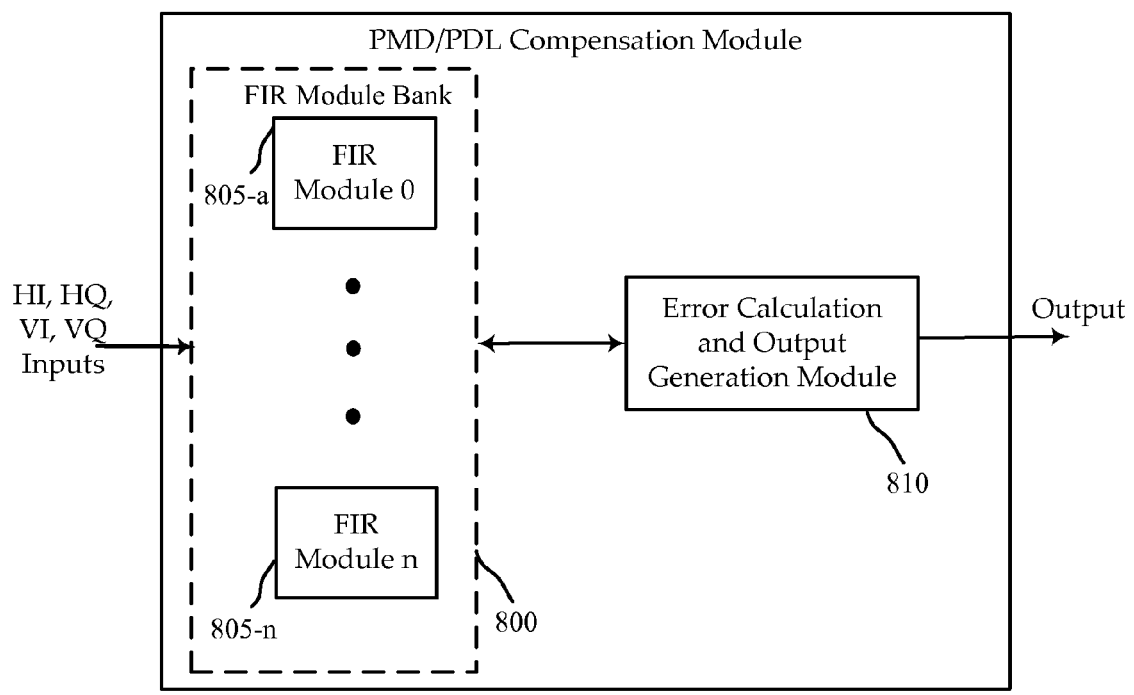
FIG. 8 is a block diagram of a polarization mode dispersion and polarization dependent loss compensation module according to various embodiments of the invention.

As described with respect to FIGS. 6 and 7, four 16-tap FIR filters are used effectively as a 64-tap filter to generate a particular channel output. The four FIR filters for a particular channel generate 384 output samples (256 on-time+128 off-time) per clock, effectively resulting in 384 64-tap filters. This number of filters, along with the tap update algorithm circuitry and related tap management logic, results in a significant number of logic gates in embodiments where the modules are implemented on an integrated circuit. In some embodiments, the functions of the FIR filter bank 500, adaptive EQ tap update module 505, and center of mass correction module 510 of FIG. 5 are split across multiple hierological logical blocks. A block diagram of functions performed by different logical blocks is illustrated in FIG. 8. According to the example of FIG. 8, a PMD/PDL compensation module 440-b includes a FIR module bank 800, and an error calculation and output generation module 810. The FIR module bank 800 includes a plurality of FIR modules 805-a through 805-n. Each of these FIR modules include a portion of a FIR filter, with the outputs of the FIR modules 805 provided to the error calculation and output generation module 810. The error calculation and output generation module 810 receives the partial outputs from the FIR modules, combines the outputs and performs any necessary further compensation, such as adding or removing symbols from the output as described above, and provides the final output for each of the channels.

Figure 9:
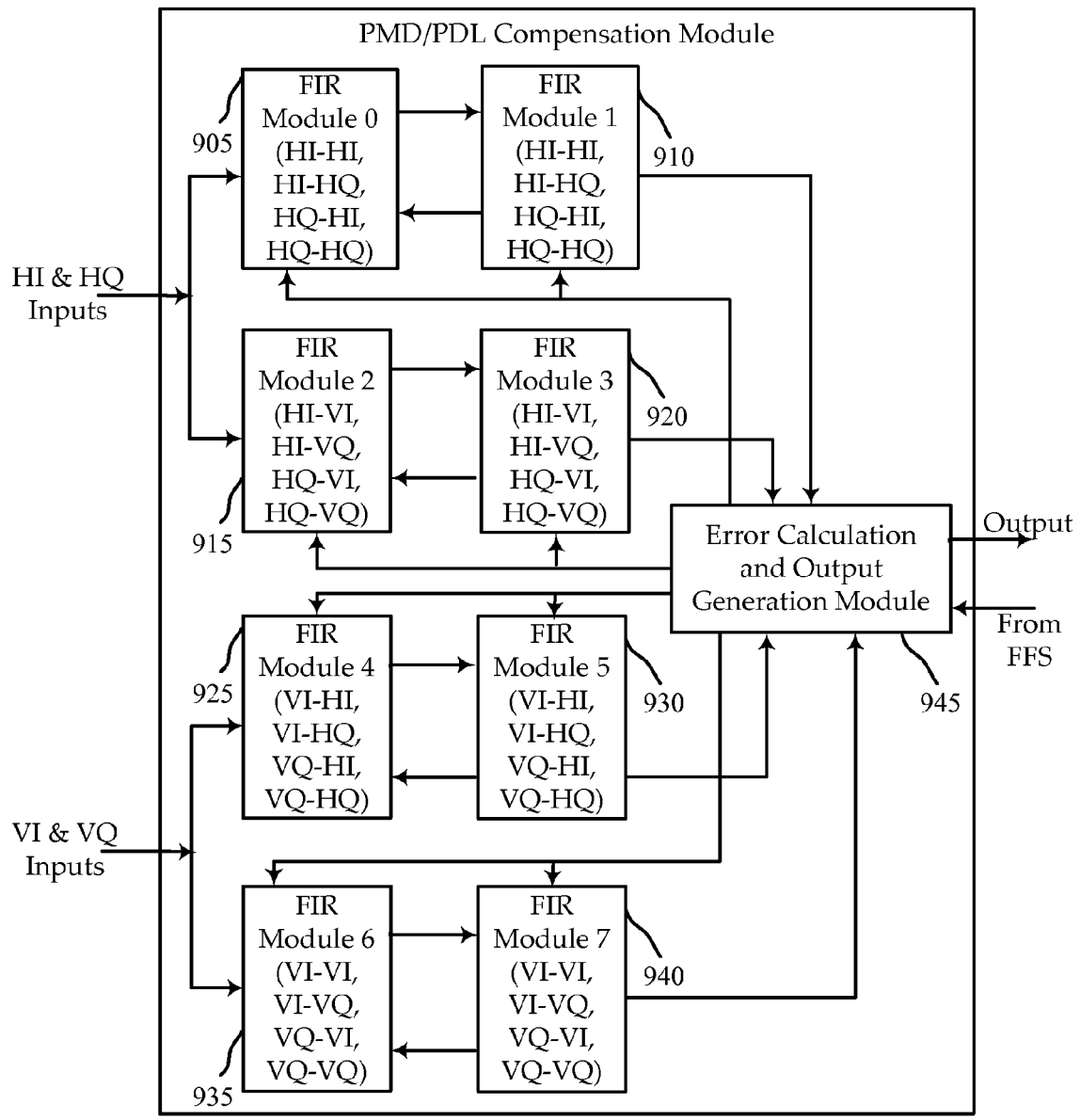
FIG. 9 is a block diagram of a polarization mode dispersion and polarization dependent loss compensation module according to an embodiment of the invention.

In one specific embodiment, illustrated in FIG. 9, a PMD/PDL compensation module 440-c includes nine functional blocks. These functional blocks may be implemented as hierarchical logical blocks in an integrated circuit design. In this embodiment, the FIR filters of the FIR filter bank 500 (FIG. 5) are formed using eight FIR modules 905-940. In this embodiment, each of the FIR modules 905-940 are architecturally the same design, with the inputs and tap management adjusted to perform the desired filtering operations. In some embodiments additional filters, possibly with more taps, may be incorporated into the design by simply adding additional FIR modules. The eight identical FIR modules 905-940 have the same number of input and output ports, and some of these ports are left unconnected for FIR modules which do not require the full number of input or output ports. For example, in the embodiment of FIG. 9, FIR modules 905, 915, 925, and 935 which receive the input channels, receive fewer inputs than FIR modules 910, 920, 930, and 940, which receive partial outputs of FIR modules 905, 915, 925, and 935. The functions, inputs, and outputs of these FIR modules 905-940 will be described in more detail below.

In the embodiment of FIG. 9, the FIR modules 905-940 perform the filtering and tap management for part of the overall FIR filtering and equalization required for PMD/PDL compensation module 440-c. In this embodiment, each FIR module 905-940 is responsible for half of a quadrant of filters such as illustrated in FIGS. 6 and 7. For example, FIR module 0 905 includes the first 8-taps (taps −7 to 0) of HI-to-HI filter 600, the first 8-taps of HI-to-HQ filter 605, the first 8-taps of HQ-to-HI filter 610, and the first 8-taps of HQ-to-HQ filter 615. Similarly, FIR module 1 910 includes the last 8-taps (taps 1 to 8) of HI-to-HI filter 600, the last 8-taps of HI-to-HQ filter 605, the last 8-taps of HQ-to-HI filter 610, and the last 8-taps of HQ-to-HQ filter 615. Concatenating FIR module 0 905 with FIR module 1 910 results in the full quadrant of FIR filters 600-615. In the event that the desired number of taps were to increase, additional FIR modules could be concatenated together to provide a bigger filter.

Figure 10:
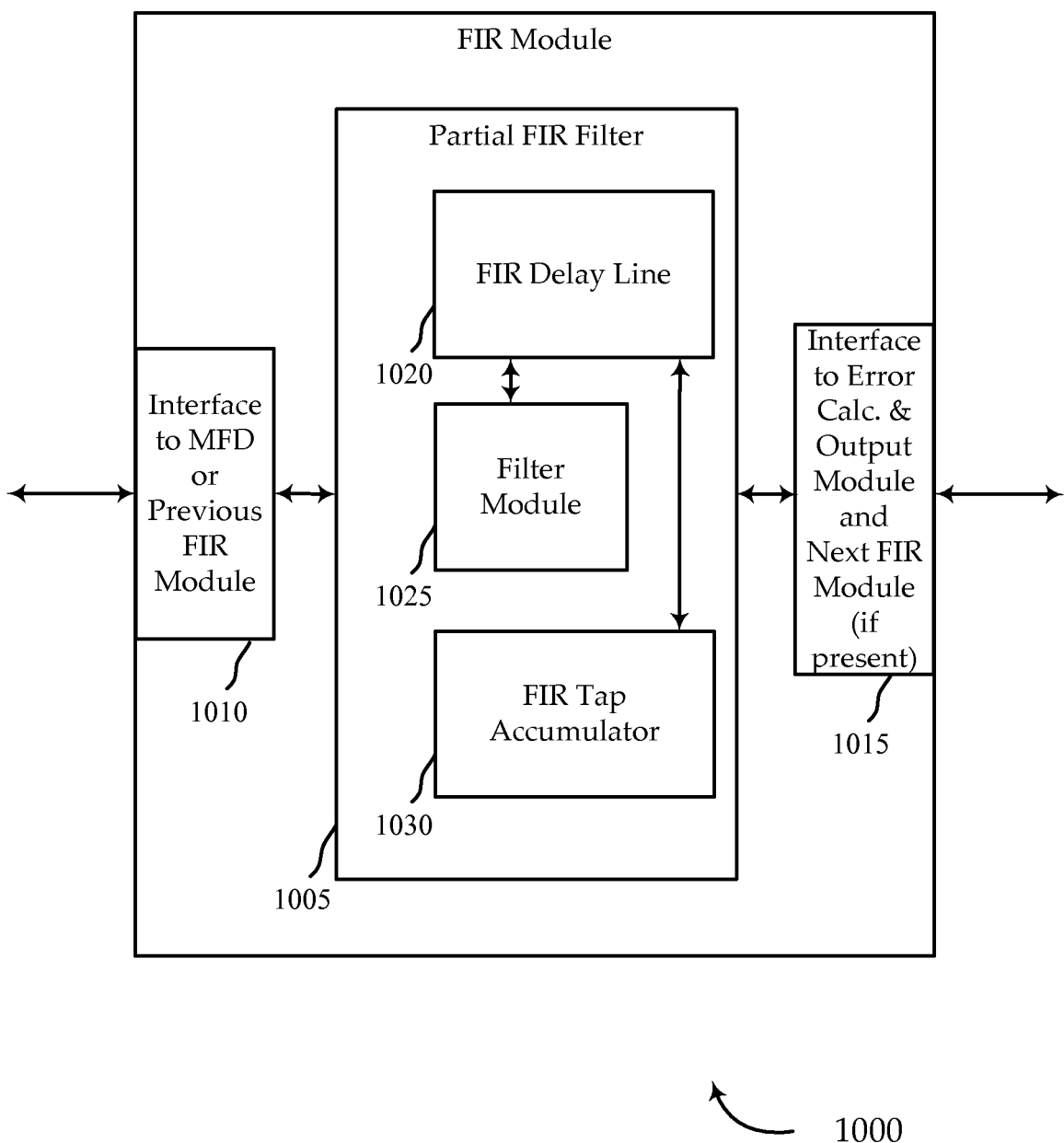
FIG. 10 is a block diagram of a finite impulse response module according to various embodiments of the invention.

With reference now to FIG. 10, a block diagram illustration of a FIR module 1000 is described. In this embodiment, the FIR module 1000 includes a partial FIR filter 1005, such as described above with respect to FIG. 9. The FIR module 1000 also includes an interface to the MFD module 435 of FIG. 4, or a previous FIR module, depending upon the particular location of the FIR module in the PMD/PDL compensation module 440. The FIR module 1000 also includes an interface to the error calculation and output module 945 of FIG. 9, and a next FIR module if present, depending upon the particular location of the FIR module 1000 in the PMD/PDL compensation module 440. The partial FIR filter 1005 includes three sub-modules, a FIR delay line module 1020, a filter module 1025, and a FIR tap accumulator module 1030.

The FIR delay line module 1020 in the embodiment of FIG. 10 implements a delay line to provide the inputs for the filter module 1025, as well as delayed copy of the inputs for tap update related calculations of FIR tap accumulator module 1030. In one embodiment, the FIR delay line module 1020 includes data busses that carry the I and Q data signals to the filter module 1025 for filter output generation, and that carry delayed I and Q data signals to the FIR tap accumulator module 1030. To provide input data for all the filters in the filter module 1025, the FIR delay line module 1020, in an embodiment, uses the incoming data (128 samples of I and 128 samples of Q) from interface 1010 on the current clock cycle, as well as part of the data from the previous clock cycle, which in this embodiment includes the last (in time) 14 samples of I and last 14 samples of Q. Based on the location of the particular FIR module 1000 in the PMD/PDL compensation module 440, the number of samples are down selected to form the inputs for the filter module 1025. For example, FIR modules that correspond to FIR Modules 905, 915, 925, and 935 of FIG. 9, receive 14 samples from the previous clock and 120 samples from the current clock, while FIR modules corresponding to FIR modules 910, 920, 930, and 940 of FIG. 9 receive the last 6 samples from the previous clock and 128 samples from the current clock.

The FIR delay line module 1020 also provides data inputs for the FIR tap accumulator module 1030. This data is a delayed copy of the data that was provided to the filter module 1025. As it takes a few clock cycles (expected to be 8 clocks) for the FIR filter outputs to be generated and then partial error calculation using the output performed in the error calculation and output generation module 945 of FIG. 9, the input data is stored until the partial error is reported back from the error calculation and output generation module 945. The error calculation and output generation module 945 according to this embodiment will be described in more detail below.

The input signals coming over the interface 1010 are registered and sent out to the next FIR module 1000 over interface 1015 when the FIR module 1000 is not the last module before the error calculation and output generation module 945 of FIG. 9. When the FIR module 1000 is the last module before the error calculation and output generation module 945, the outputs to the next FIR module 1000 are left unconnected. In one embodiment, for FIR modules 1000 at the start of the concatenation, a tag counter will generate a tag and stamp for the input data signals, which will be checked at the input subsequent FIR modules 1000. The tags are maintained through all the data interfaces up to the error calculation and output generation module 945, and in the feedback from error calculation and output generation module 945 back to the FIR modules 1000. This allows the FIR modules to line-up the correct input I and Q signals with the partial tap error updates relayed back by the error calculation and output generation module 945.

The filter module 1025 receives input data samples from FIR delay line module 1020, receives filter taps from FIR tap accumulator module 1030, and may receive partial results for filter outputs from the previous filter module 1000 to create updated partial filter outputs for the next filter module or for the error calculation and output generation module 945 of FIG. 9. In one embodiment, filter module 1025 has 64 16-tap partial filters for generating on-time partial I outputs, 32 16-tap partial filters for generating off-time partial I outputs, 64 16-tap partial filters for generating on-time partial Q outputs and 32 16-tap partial filters for generating off-time partial Q outputs. The 16-tap filters are referred to as partial filters because they are 16 of the 64 overall taps required to generate a complete output sample. Similarly the output of a 16-tap filter is referred to as a partial output and will be used in the error calculation and output generation module 945 to generate the final output. From the 134 samples of I and 134 samples of Q received from the FIR delay line module 1020, samples index 0 to 7 go to a first set of on-time partial filters, samples 2 to 9 go to a second set of on-time partial filters, and so on, until samples 126 to 133 go to a sixty-fourth set if on-time partial filters. Similarly, sample index 1 to 8 to a first set of off-time partial filters, samples 3 to 10 to a second set of off-time partial filters, and so on, until samples 63 to 70 go to a thirty-second set of off-time partial filters. In an embodiment, a 16-tap filter is be divided into four 4-tap FIRs where computation for each 4-tap FIR filter can be performed in one clock cycle. The outputs of the 4-tap FIRs as well as the partial output from the previous FIR module 1000 will be summed together to form a 16-bit partial output for the next FIR module.

The FIR tap accumulator module 1030 is responsible for FIR filter tap management. This module receives partial tap error calculations from the error calculation and output generation module 945 the interface 1015 and, using the delayed copies of the input data from the FRI delay line module 1020, calculates the final error signal for the tap updates. As there are 16 independent tap values in every FIR module 1000 according to this embodiment, there are 16 error calculators to tally up the error updates for these taps. These error values are passed to the 16 Tap Accumulators that weigh the error updates with a programmable scale factor before updating the tap values. For example, an error calculator may receive a partial error from the error calculation and output generation module 945 of FIG. 9, which is multiplied to the delayed copy of the input signals that were used to calculate the on-time output samples used to generate the partial errors. Thus, for the 64 on-time outputs generated from the FIR module 1000, the partial error is multiplied by the corresponding input data values and the terms are combined via an Adder tree. The FIR Tap Accumulators module includes accumulators that are 32-bits wide where the top 8-bits will be used as the filter Taps. On any clock cycle the Tap Accumulator may need to scale incoming data and error signals, re-initialize its values to the default values in the event of a re-initialization command, and or shift taps, based on an indications received from error calculation and output generation module 945. The FIR tap accumulator module 1030 also provides current tap values to the error calculation and output generation module 945.

With reference again to FIG. 9, the error calculation and output generation module 945 of this embodiment is described in more detail. The error calculation and output generation module 945 of FIG. 9 operates to perform several functions, including functions to: collect the partial outputs from the FIR modules 905-940, and generate the final output; generate part of the tap error update for the FIR modules 905-940; combine the error related metrics generated by the FIR modules 905-940; and generate the shift required in the filter taps; and add or remove symbols to/from the output data to compensate for the center of mass related shift in taps. The error calculation and output generation module 945 receives the partial filter outputs coming from the FIR modules 905-940, and generates the overall filtered outputs for use generating partial tap update error signals as well as for use in Center of Mass (CoM) based updates, and sends out the final output to the CFAT module 425 and CPR module 450 of FIG. 4. The error calculation and output generation module 945 also generates on-time and off-time sample for the four channels (HI, HQ, VI and VQ) going to the STAT module 445 of FIG. 5.

The error calculation and output generation module 945 of this embodiment also performs part of the calculations required to generate the tap updates using CMA. In this embodiment, the error calculation and output generation module 945 receives on-time output samples uses a bank of CMA partial error calculators to generate partial errors that are relayed back to the FIR modules 905-940 for use in tap updates. In one embodiment, a CMA partial error calculator receives a symbol corresponding to an I and a Q input. The symbol energy is calculated, followed by a subtraction from a programmable threshold. Based on a mode selection the sign, or sign as well as magnitude, of the difference of the symbol energy from the threshold is used for CMA calculations. In case of sign only approach a programmable constant is used as the magnitude. This difference term is multiplied by the incoming filtered samples to generate the partial errors. These errors are used in tap updates at each of the FIR modules 905-940.

In one embodiment, the error calculation and output generation module 945 also performs center-of-mass (CoM) related offset and error calculation, tap offset control as well as tap reset control. The error calculation and output generation module 945 of this embodiment receives partial CoM metrics from FIR modules 910, 920, 930, and 940, and generates outputs that can help counter the movement of the FIR filter taps towards the edges of the filter. The partial CoM metrics may be periodically evaluated for an indication of a bias of the FIR filter taps that is moving towards the edges of the filter. In one embodiment, the partial CoM metrics from the FIR module outputs for a particular pole are summed together and scaled by a pole-dependent scaling factor. These gains/weights account for PDL related mismatch between the two poles. The scaled results are added together and this accumulated value is used to generate any CoM error updates that can shift the FIR filter taps more towards the center of the filter. For example, error calculation and output generation module 945 may shift the FIR filter taps towards the center of the filter if a sum of the partial CoM metrics exceeds a predetermined threshold relative to a tap value of a center tap.

Figure 11:
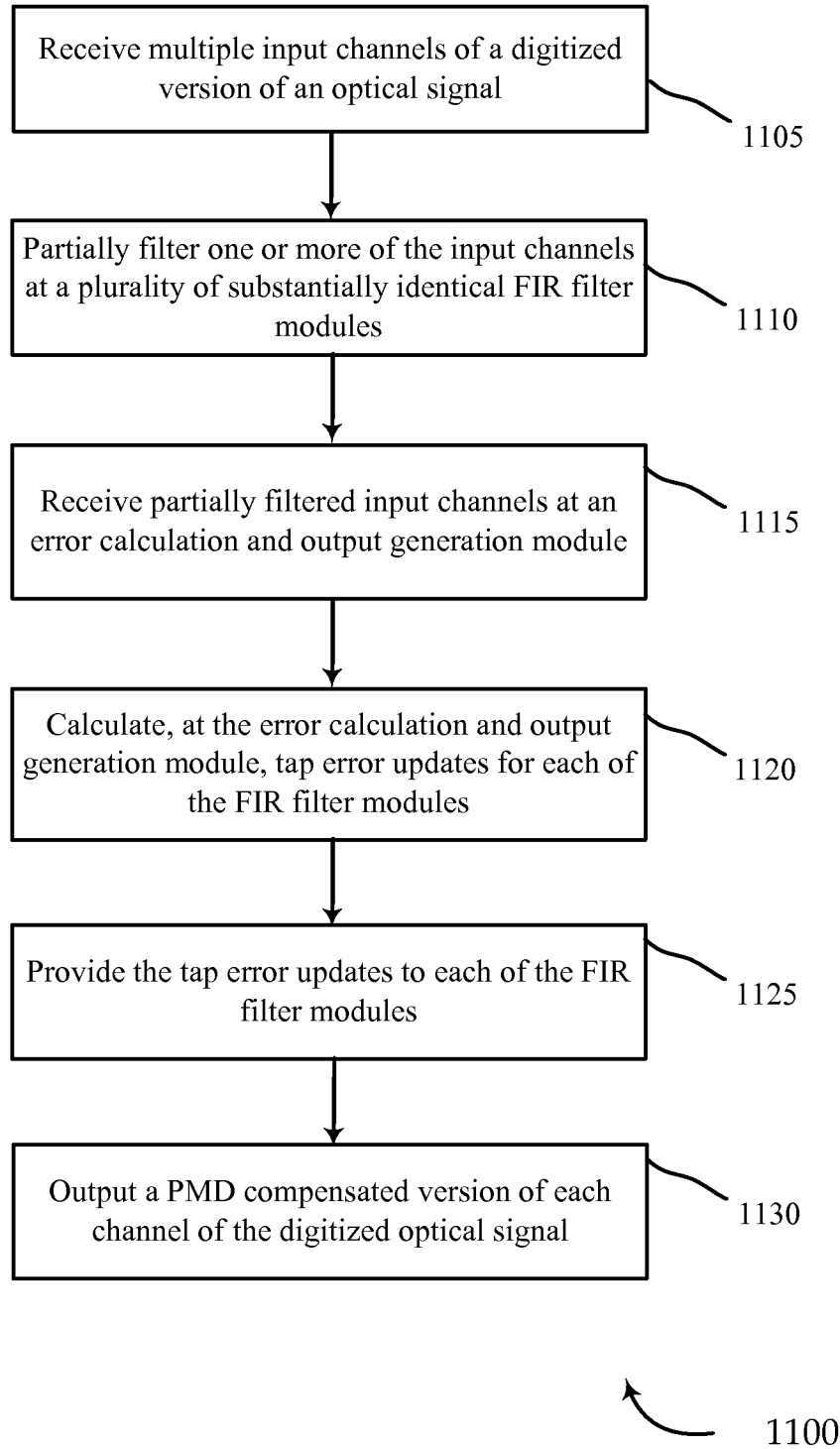
FIG. 11 is a flow chart of a method for compensating polarization mode dispersion and polarization dependent loss according to various embodiments of the invention.

With reference now to FIG. 11, a flow chart diagram of the operational steps for PMD compensation 1100 according to an embodiment is described. Initially, according to block 1105, the system receives multiple input channels of a digitized version of an optical signal. At block 1110, one or more of the input channels are partially filtered at a plurality of substantially identical FIR filter modules. Partially filtered input channels are received at an error calculation and output generation module, at block 1115. The error calculation and output generation module calculates tap error updates for each of the FIR filter modules, according to block 1120. The tap error updates are provided to each of the FIR filter modules at block 1125. Finally, at block 1130, a PMD compensated version of each channel of the digitized optical signal is output.

Figure 12:
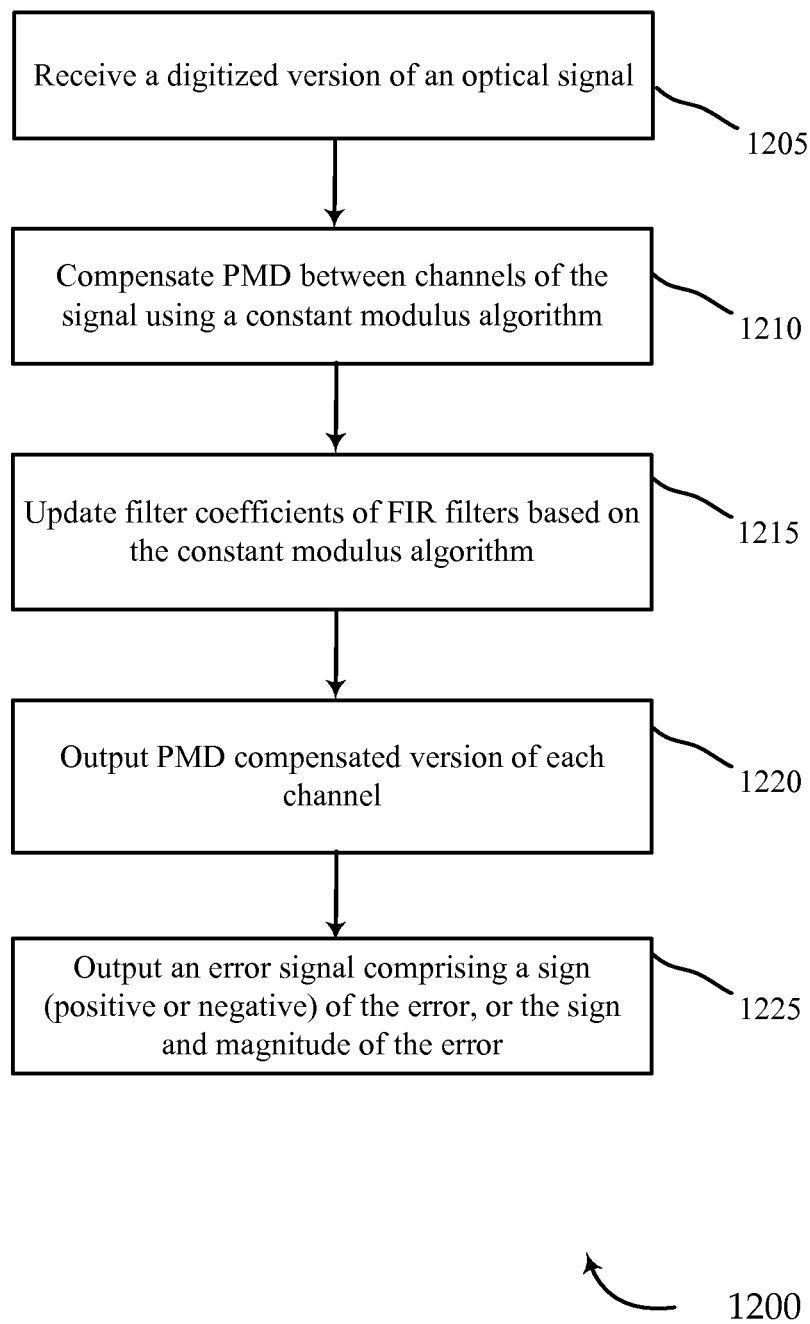
FIG. 12 is a flow chart of a method for compensating polarization mode dispersion and polarization dependent loss based on a constant modulus algorithm according to various embodiments of the invention.

With reference now to FIG. 12, a flow chart diagram of the operational steps for PMD compensation 1200 according to an embodiment is described. Initially, according to block 1205, a digitized version of an optical signal is received. At block 1210, PMD between channels of the signal is compensated using a constant modulus algorithm. Filter coefficients of FIR filters are updated based on the constant modulus algorithm, as noted at block 1215. A PMD compensated version of each channel is output, according to block 1220. At block 1225, an error signal comprising a sign (positive or negative) of the error, or the sign and magnitude of the error is output, which may be used to update FIR filter coefficients.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of embodiments of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An apparatus for adaptive equalization of polarization mode dispersion in an optical signal, comprising:
   an input configured to receive multiple input channels corresponding to digitized versions of in-phase and quadrature channels of horizontal and vertical polarity optical signals;
   a plurality of substantially identical finite impulse response (FIR) filter modules, configured to receive the input channels, receive filter tap error updates, adjust FIR filter tap values based on the received tap error updates, partially filter one or more of the input channels based on the adjusted FIR filter tap values, and output one or more partially filtered input channels; and
   an error calculation and output generation module configured to receive the partially filtered input channels from the FIR filter modules, combine the partially filtered input channels, output a polarization mode dispersion compensated version of each channel of the digitized optical signal, calculate filter tap error updates, and provide the tap error updates to the plurality of FIR filter modules.

2. The apparatus of claim 1, wherein the plurality of FIR filter modules comprise:
   a first subset of FIR filter modules configured to receive a first subset of the multiple input channels and to output a partially filtered first subset of the multiple input channels, each of the first subset of FIR filter modules including a first subset of FIR filter taps for one or more FIR filters; and
   a second subset of FIR filter modules configured to receive the partially filtered first subset of the multiple input channels and to output a further partially filtered first subset of the multiple input channels, and each of the second subset of FIR filter modules including a second subset of FIR filter taps for each of the one or more FIR filters.

3. The apparatus of claim 2, wherein each of the one or more FIR filters comprise a plurality of FIR filter taps, and wherein the first subset of FIR filter modules comprise a first subset of the plurality of FIR filter taps for each FIR filter, and the second subset of FIR filter modules comprise the remaining FIR filter taps for each FIR filter.

4. The apparatus of claim 1, wherein the tap error updates calculated by the error calculation and output generation module are partial tap error updates.

5. The apparatus of claim 4, wherein the FIR filter modules calculate partial tap error value updates that are combined with the tap error updates of the error calculation and output generation module to form filter tap values for FIR filters formed from the FIR filter modules.

6. The apparatus of claim 5, wherein the error calculation and output generation module shifts the tap error updates when a metric indicating a bias of the taps exceeds a predetermined threshold relative to a tap value of a center tap.

7. The apparatus of claim 6, wherein the error calculation and output generation module compensates the output based on the sum of prior tap values.

8. The apparatus of claim 1, wherein the error calculation and output generation module comprises a constant modulus algorithm module that computes tap error updates to compensate for the effects of polarization mode dispersion.

9. The apparatus of claim 8, wherein the constant modulus algorithm module provides a plurality of tap error updates for a plurality of FIR filters formed by the plurality of FIR filter modules.

10. The apparatus of claim 1, wherein the plurality of FIR filter modules comprise a plurality of real-valued FIR filters.

11. The apparatus of claim 1, wherein the plurality of FIR filter modules comprise a plurality of complex-valued FIR filters.

12. The apparatus of claim 1, wherein the input is configured to receive a stream of digitized samples of the optical signal, and the error calculation and output generation module provides tap error updates for each sample based on one or more prior samples.

13. The apparatus of claim 12, wherein the error calculation and output generation module provides tap error updates to generate updated tap values that each have a substantially equal distance to a centerpoint.

14. The apparatus of claim 12, wherein the error calculation and output generation module provides tap error updates to generate updated tap values that each have a substantially equal distance to a centerpoint, and a radius of a circle containing output samples of the polarization mode dispersion compensated version of each channel of the digitized optical signal is substantially minimized.

15. The apparatus of claim 1, wherein the error calculation and output generation module further computes an error signal comprising a positive or negative sign.

16. The apparatus of claim 1, wherein the error calculation and output generation module further computes an error signal comprising a positive or negative sign and a computed magnitude of error.

17. The apparatus of claim 1, wherein the input is further configured to receive initial timing offset information related to two or more channels in the received signal, and the filter module is initialized based on the initial timing offset information.

18. The apparatus of claim 1, wherein the error calculation and output generation module is further configured to receive an indication that a polarization lock is invalid and provide the tap error updates to the plurality of FIR filter modules to set tap values to a default value.

19. A method for adaptive equalization of polarization mode dispersion in an optical signal, the method comprising:
   receiving multiple input channels corresponding to digitized versions of in-phase and quadrature channels of horizontal and vertical polarity optical signals;
   partially filtering one or more of the input channels at a plurality of substantially identical FIR filter modules, each of the plurality of FIR filter modules including a portion of the filter taps for one or more FIR filters;
   receiving partially filtered input channels at an error calculation and output generation module;

calculating, at the error calculation and output generation module, tap error updates for each of the FIR filter modules;

outputting, from the error calculation and output generation module, the tap error updates to the plurality of FIR filter modules; and outputting, from the error calculation and output generation module, a polarization mode dispersion compensated version of each channel of the digitized optical signal.

20. The method of claim 19, further comprising:
collecting partial outputs from each of the FIR filter modules at the error calculation and output generation module,
compensating the partial outputs; and
outputting the polarization mode dispersion compensated version of each channel of the digitized optical signal.

21. The method of claim 19, wherein the calculating comprises generating, at the error calculation and output generation module, a partial tap error update for each of a plurality of FIR filters formed from the plurality of FIR filter modules.

22. The method of claim 21, wherein the FIR filter modules calculate partial tap error updates that are combined with the tap error updates of the error calculation and output generation module to form filter tap values for the FIR filters.

23. The method of claim 22, further comprising:
calculating, at the error calculation and output generation module, a metric for prior filter tap values for the FIR filters; and
shifting the tap error updates when the metric indicates a bias of the filter tap values that exceeds a predetermined threshold relative to a tap value of a center tap.

24. The method of claim 19, wherein the calculating comprises computing tap error updates based on a constant modulus algorithm.

25. The method of claim 19, further comprising:
receiving, at the error calculation and output generation module, an indication that a polarization lock is invalid; and
outputting, from the error calculation and output generation module, the tap error updates to the plurality of FIR filter modules to set tap values to a default value.

* * * * *